(12) United States Patent
Rakshit et al.

(10) Patent No.: US 11,334,383 B2
(45) Date of Patent: May 17, 2022

(54) DIGITAL ASSISTANT RESPONSE SYSTEM TO OVERLAPPING REQUESTS USING PRIORITIZATION AND PROVIDING COMBINED RESPONSES BASED ON COMBINABILITY

(71) Applicant: International Business Machines Corporation, Armonk, NY (US)

(72) Inventors: Sarbajit K. Rakshit, Kolkata (IN); Martin G. Keen, Cary, NC (US); James E. Bostick, Cedar Park, TX (US); John M. Ganci, Jr., Raleigh, NC (US)

(73) Assignee: International Business Machines Corporation, Armonk, NY (US)

( * ) Notice: Subject to any disclaimer, the term of this patent is extended or adjusted under 35 U.S.C. 154(b) by 219 days.

(21) Appl. No.: 16/393,952

(22) Filed: Apr. 24, 2019

(65) Prior Publication Data

US 2020/0341804 A1 Oct. 29, 2020

(51) Int. Cl.
| | |
|---|---|
| *G06F 9/48* | (2006.01) |
| *G06N 5/02* | (2006.01) |
| *G06F 9/451* | (2018.01) |
| *G06N 5/04* | (2006.01) |
| *G06F 3/16* | (2006.01) |
| *G06N 3/00* | (2006.01) |
| *G10L 15/22* | (2006.01) |

(52) U.S. Cl.
CPC ............ *G06F 9/4881* (2013.01); *G06F 9/453* (2018.02); *G06N 5/02* (2013.01); *G06F 3/167* (2013.01); *G06N 3/006* (2013.01); *G06N 5/04* (2013.01); *G10L 15/22* (2013.01)

(58) Field of Classification Search
CPC .......... G06F 9/4881; G06F 9/453; G06F 3/16; G06F 3/167; G06N 5/02; G06N 3/006; G06N 5/04; G10L 15/00; G10L 15/22
See application file for complete search history.

(56) References Cited

U.S. PATENT DOCUMENTS

| | | | |
|---|---|---|---|
| 10,049,153 B2 | 8/2018 | Chandrasekaran et al. | |
| 10,055,681 B2 | 8/2018 | Brown et al. | |
| 10,353,906 B2* | 7/2019 | Souche ............. | G06F 16/24578 |
| 11,153,678 B1* | 10/2021 | Jorgovanovic ........ | H04W 76/14 |
| 2014/0074483 A1* | 3/2014 | van Os ................... | G06F 3/167 |
| | | | 704/275 |
| 2014/0244712 A1* | 8/2014 | Walters .................. | G06F 3/167 |
| | | | 709/202 |
| 2017/0004189 A1 | 1/2017 | Cunico et al. | |

(Continued)

*Primary Examiner* — Michael W Ayers
(74) *Attorney, Agent, or Firm* — Yee & Associates, P.C.

(57) ABSTRACT

A method, apparatus, computer system, and computer program product for processing requests. Overlapping requests are received by a computer system from users using a shared client device. The overlapping requests are requests for which responses have not been sent to the shared client device. Priorities for the overlapping requests are determined by the computer system based on a set of priority considerations for the overlapping requests and using request information derived from the overlapping requests in which the request information includes at least one of an emotional state or an urgency. The overlapping requests are processed by the computer system based on the priorities determined for the overlapping requests.

11 Claims, 7 Drawing Sheets

(56) References Cited

U.S. PATENT DOCUMENTS

| | | | |
|---|---|---|---|
| 2017/0242860 A1 | 8/2017 | Souche et al. | |
| 2018/0182389 A1* | 6/2018 | Devaraj | H04L 51/046 |
| 2018/0293484 A1* | 10/2018 | Wang | G06F 3/167 |
| 2018/0373547 A1* | 12/2018 | Dawes | G06F 16/90332 |
| 2019/0035395 A1* | 1/2019 | Yumoto | G10L 15/22 |
| 2019/0050238 A1* | 2/2019 | Lim | H04W 4/38 |
| 2019/0088257 A1* | 3/2019 | Shah | G06F 3/167 |
| 2019/0295544 A1* | 9/2019 | Garcia | G10L 15/22 |
| 2020/0125398 A1* | 4/2020 | Araki | G06Q 10/109 |
| 2020/0211573 A1* | 7/2020 | Bechtel | G16H 40/67 |
| 2020/0335106 A1* | 10/2020 | Pratt | G10L 15/22 |
| 2021/0074299 A1* | 3/2021 | Hwang | G06F 16/90332 |

\* cited by examiner

DIGITAL ASSISTANT RESPONSE SYSTEM TO OVERLAPPING REQUESTS USING PRIORITIZATION AND PROVIDING COMBINED RESPONSES BASED ON COMBINABILITY

BACKGROUND

1. Field

The disclosure relates generally to an improved computer system and, more specifically, to managing multiple requests made to digital assistants on shared client devices.

2. Description of the Related Art

A digital assistant is a software agent that answers questions and performs tasks or services for an individual user based on verbal communications. A digital assistant is also referred to as a virtual assistant or intelligent personal assistant. A user can ask a digital assistant questions, control home automation devices, set a timer, play music, and manage other tasks relating to items such as email, to-do-lists, and calendars using verbal communications. The digital assistant uses natural language processing to interpret human speech and respond using synthesized voices.

A digital assistant can be accessed by a user through a client device such as a smartwatch, a mobile phone, a smart speaker, a tablet computer, or other types of devices. Some of these devices are shared devices that can receive requests from multiple users. For example, a smart speaker can be located in a family room or an office where the smart speaker can receive requests from multiple users.

For example, multiple users may be present in a room in which a smart speaker is present for accessing a digital assistant. A first user can start making requests via verbal communications. Before the first user has completed the requests, a second user in the room can make a request. In this situation, the requests are placed into an ordered queue and are processed in the order in which they are received from the different users.

SUMMARY

According to one embodiment of the present invention, a method processes requests. Overlapping requests are received by a computer system from users using a shared client device, wherein the overlapping requests are requests for which responses have not been sent to the shared client device. Priorities are determined for the overlapping requests based on a set of priority considerations for the overlapping requests and using request information derived from the overlapping requests in which the request information includes at least one of an emotional state or an urgency. The overlapping requests are processed by the computer system based on the priorities determined for the overlapping requests.

According to another embodiment of the present invention, a request processing system comprises a computer system. The computer system receives overlapping requests from users using a shared client device. The overlapping requests are requests for which responses have not been sent to the shared client device. The computer system determines priorities for the overlapping requests based on a set of priority considerations for the overlapping requests and using request information derived from the overlapping requests in which the request information includes at least one of an emotional state or an urgency and processes the overlapping requests based on the priorities determined for the overlapping requests.

According to yet another embodiment of the present invention, a computer program product for processing requests comprises a computer-readable-storage media with first program code, second program code, and third program code stored on the computer-readable storage media. The first program code is run to receive overlapping requests from users using a shared client device. The overlapping requests are requests for which responses have not been sent to the shared client device. The second program code is run to determine priorities for the overlapping requests based on a set of priority considerations for the overlapping requests and using request information derived from the overlapping requests in which the request information includes at least one of an emotional state or an urgency. The third program code is run to process the overlapping requests based on the priorities determined for the overlapping requests.

DETAILED DESCRIPTION

Figure 1:
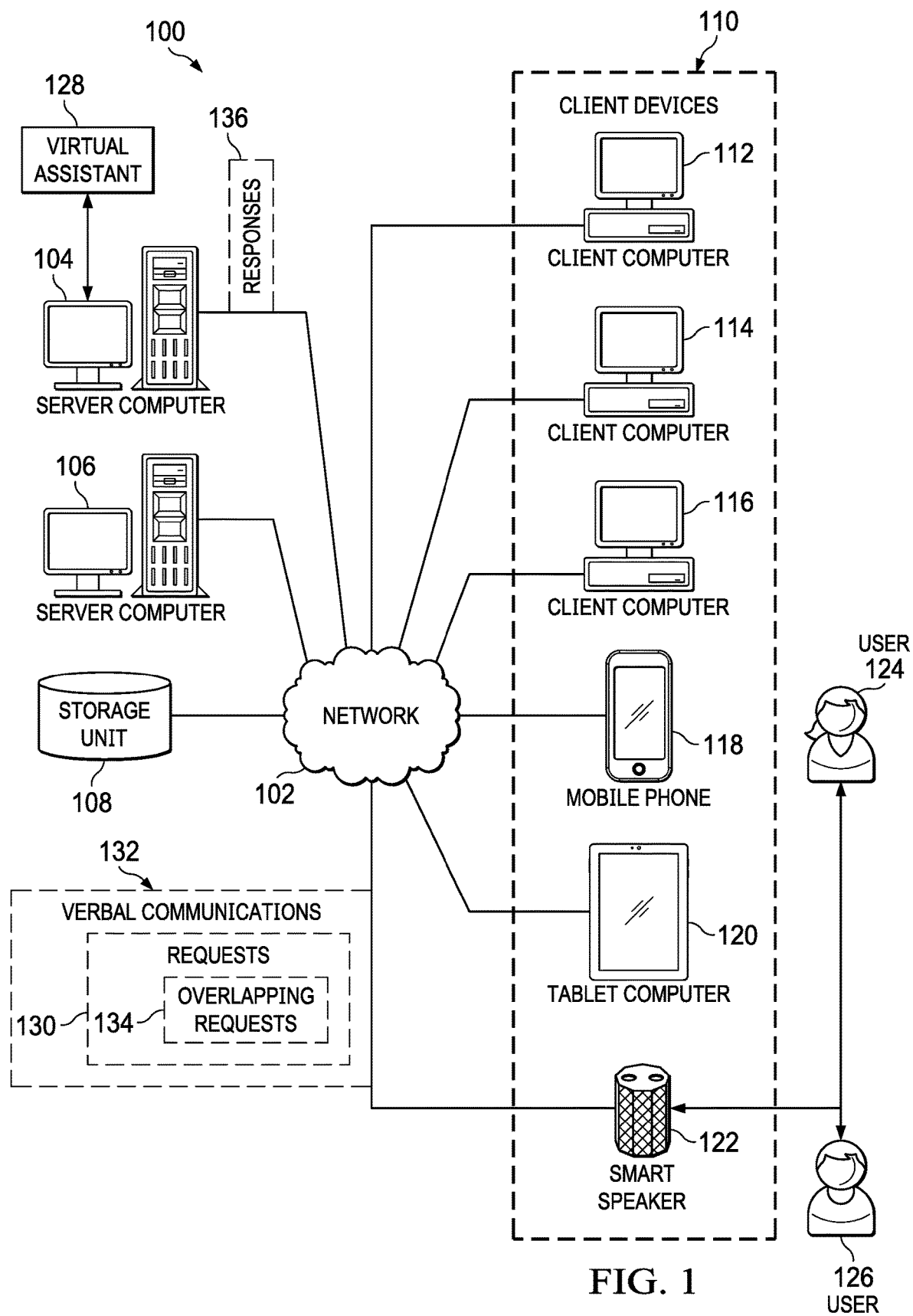
FIG. 1 is a pictorial representation of a network of data processing systems in which illustrative embodiments may be implemented.

The present invention may be a system, a method, and/or a computer program product at any possible technical detail level of integration. The computer program product may include a computer-readable storage medium (or media) having computer-readable program instructions thereon for causing a processor to carry out aspects of the present invention.

The computer-readable storage medium can be a tangible device that can retain and store instructions for use by an instruction execution device. The computer-readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer-readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer-readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer-readable program instructions described herein can be downloaded to respective computing/processing devices from a computer-readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer-readable program instructions from the network and forwards the computer-readable program instructions for storage in a computer-readable storage medium within the respective computing/processing device.

Computer-readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer-readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer-readable program instructions by utilizing state information of the computer-readable program instructions to personalize the electronic circuitry, in order to perform aspects of the present invention.

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer-readable program instructions.

These computer program instructions may be provided to a processor of a general-purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer program instructions may also be stored in a computer-readable medium that can direct a computer, other programmable data processing apparatus, or other devices to function in a particular manner, such that the instructions stored in the computer-readable medium produce an article of manufacture including instructions which implement the function/act specified in the flowchart and/or block diagram block or blocks.

The computer-readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The illustrative embodiments recognize and take into account a number of different considerations. For example, the illustrative embodiments recognize and take into account that a virtual assistant responding to verbal requests, such as questions or commands, in the order received from a shared client device from more than one user may not be the most desirable manner for processing requests by the virtual assistant.

For example, the illustrative embodiments recognize and take into account that processing requests in the order received may not provide the most desirable experience for multiple users if earlier requests take more processing time than later requests. For example, the illustrative embodiments recognize and take into account that a first user may make requests to show reminders. The illustrative embodiments recognize and take into account that a second user may request the location of an emergency room. The illustrative embodiments recognize and take into account that after the second user makes a request, the first user may make a request to mark a reminder as complete. The illustrative embodiments recognize and take into account that the time needed to find and present reminders may take much more time than desired when the second user has a more urgent request.

Therefore, it would be desirable to have a method, an apparatus, a system, and a computer program product that take into account at least some of the issues discussed above, as well as other possible issues. For example, it would be desirable to have a method and apparatus that overcome a technical problem with processing requests in the order received.

Thus, the illustrative embodiments provide a method, apparatus, system, and computer program product for processing requests. In one illustrative example, a method processes requests. Overlapping requests are received by a computer system from users using a shared client device, wherein the overlapping requests are requests for which responses have not been sent to the shared client device. Priorities for the overlapping requests are determined by the computer system. The overlapping requests are processed by the computer system based on the priorities determined for the overlapping requests.

With reference now to the figures and, in particular, with reference to FIG. 1, a pictorial representation of a network of data processing systems is depicted in which illustrative embodiments may be implemented. Network data processing system 100 is a network of computers in which the illustrative embodiments may be implemented. Network data processing system 100 contains network 102, which is the medium used to provide communications links between various devices and computers connected together within network data processing system 100. Network 102 may include connections, such as wire, wireless communication links, or fiber optic cables.

In the depicted example, server computer 104 and server computer 106 connect to network 102 along with storage unit 108. In addition, client devices 110 connect to network 102. As depicted, client devices 110 include client computer 112, client computer 114, and client computer 116. Client devices 110 can be, for example, computers, workstations, or network computers. In the depicted example, server computer 104 provides information, such as boot files, operating system images, and applications to client devices 110. Further, client devices 110 can also include other types of client devices such as mobile phone 118, tablet computer 120, and smart speaker 122. In this illustrative example, server computer 104, server computer 106, storage unit 108, and client devices 110 are network devices that connect to network 102 in which network 102 is the communications media for these network devices. Some or all of client devices 110 may form an Internet of things (IoT) in which these physical devices can connect to network 102 and exchange information with each other over network 102.

Client devices 110 are clients to server computer 104 in this example. Network data processing system 100 may include additional server computers, client computers, and other devices not shown. Client devices 110 connect to network 102 utilizing at least one of wired, optical fiber, or wireless connections.

Program code located in network data processing system 100 can be stored on a computer-recordable storage medium and downloaded to a data processing system or other device for use. For example, program code can be stored on a computer-recordable storage medium on server computer 104 and downloaded to client devices 110 over network 102 for use on client devices 110.

In the depicted example, network data processing system 100 is the Internet with network 102 representing a worldwide collection of networks and gateways that use the Transmission Control Protocol/Internet Protocol (TCP/IP) suite of protocols to communicate with one another. At the heart of the Internet is a backbone of high-speed data communication lines between major nodes or host computers consisting of thousands of commercial, governmental, educational, and other computer systems that route data and messages. Of course, network data processing system 100 also may be implemented using a number of different types of networks. For example, network 102 can be comprised of at least one of the Internet, an intranet, a local area network (LAN), a metropolitan area network (MAN), or a wide area network (WAN). FIG. 1 is intended as an example, and not as an architectural limitation for the different illustrative embodiments.

As used herein, "a number of" when used with reference to items, means one or more items. For example, "a number of different types of networks" is one or more different types of networks.

Further, the phrase "at least one of," when used with a list of items, means different combinations of one or more of the listed items can be used, and only one of each item in the list may be needed. In other words, "at least one of" means any combination of items and number of items may be used from the list, but not all of the items in the list are required. The item can be a particular object, a thing, or a category.

For example, without limitation, "at least one of item A, item B, or item C" may include item A, item A and item B, or item B. This example also may include item A, item B, and item C or item B and item C. Of course, any combinations of these items can be present. In some illustrative examples, "at least one of" can be, for example, without limitation, two of item A; one of item B; and ten of item C; four of item B and seven of item C; or other suitable combinations.

As depicted, smart speaker 122 is a shared client device in client devices 110. In this illustrative example, user 124 and user 126 are human users and both interact with virtual assistant 128 in server computer 104 using smart speaker 122. Both user 124 and user 126 make requests 130 in verbal communications 132 that are detected by smart speaker 122. Requests 130, in this example, can be at least one of a question, a query, or a command.

For example, user 124 can make a request in requests 130 for reminders and make a request in requests 130 to mark a reminder as complete. User 126 can make a request in requests 130 for a location of the nearest emergency room. In the illustrative example, the request by user 126 for the location of the emergency room is made after the request for reminders and prior to the request for marketing a reminder as complete.

The request made by user 126 is an overlapping request in requests 130 that overlaps with requests in requests 130 made by user 124 in this illustrative example. In this illustrative example, requests 130 are overlapping requests 134.

Virtual assistant 128 does not necessarily process requests 130 in the order that requests 130 were made by user 124 and user 126. When requests 130 are overlapping requests 134, virtual assistant 128 determines priorities for overlapping requests 134 in requests 130 and processes overlapping requests 134 based on the priorities determined for overlapping requests 134.

For example, virtual assistant 128 can calculate a comparative priority score for each of overlapping requests 134 made by user 124 and user 126 to determine the order in which overlapping requests 134 should be processed. In the illustrative example, the comparative priority for each request in overlapping requests 134 can be determined based on factors, such as at least one of a relative importance, a privacy, a continuity, a combinability of responses, a task duration, a presence of a trusted user, a time constraint, or other suitable considerations.

In this illustrative example, the two requests in overlapping requests 134 made by user 124 have continuity because these requests relate to reminders. The request in overlapping requests 134 made by user 126 has a higher relative importance than either of the requests made by user 124. As a result, the request made by user 126 has a higher comparative priority score than the requests made by user 124.

In this illustrative example, virtual assistant 128 processes the request from user 126 and provides the location prior to processing the other two requests for user 124 in responses 136. In this manner, virtual assistant 128 processes overlapping requests 134 in manner that is different from current systems that process requests on a first-in-first-out basis for multiple users. This processing of overlapping requests 134 by virtual assistant 128 can provide a more efficient and desirable manner for sending responses 136 to user 124 and user 126.

In FIG. 1, other client devices in client devices 110 can be shared client devices used by user 124 and user 126. For example, mobile phone 118 and tablet computer 120 can be shared devices that are used by both user 124 and user 126. The determination of comparative priorities can be performed for one or more users in addition to user 124 and user 126.

Figure 2:
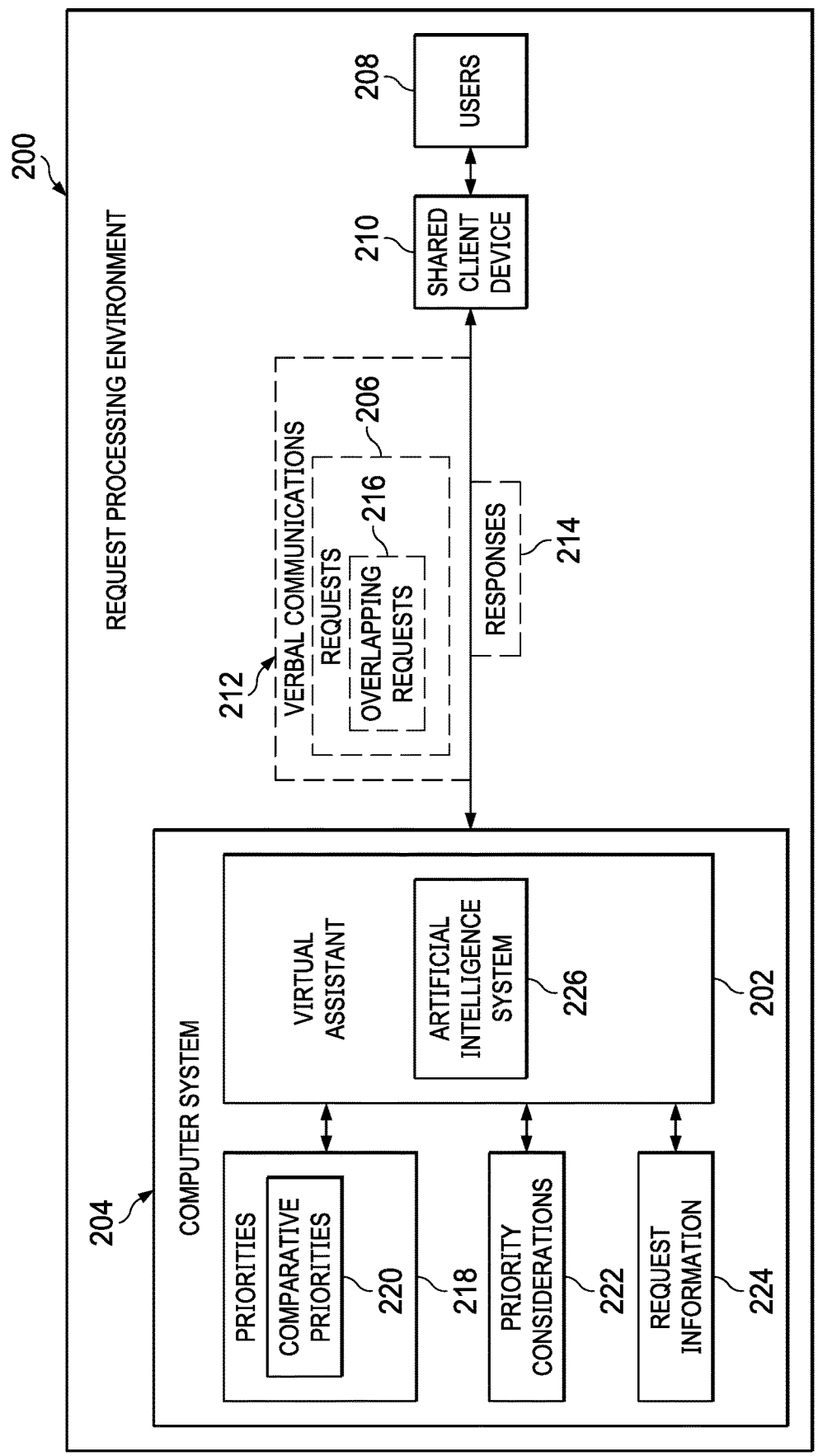
FIG. 2 is a block diagram of a request processing environment in accordance with an illustrative embodiment.

With reference now to FIG. 2, a block diagram of a request processing environment is depicted in accordance with an illustrative embodiment. In this illustrative example, request processing environment 200 includes components that can be implemented in hardware, such as the hardware shown in network data processing system 100 in FIG. 1.

In this illustrative example, virtual assistant 202 running on computer system 204 is a request processing system in request processing environment 200 and can receive requests 206 from users 208 though shared client device 210. In this illustrative example, shared client device 210 detects voices of users 208 and sends verbal communications 212 containing requests 206 to virtual assistant 202. As depicted, verbal communications 212 is audio data generated by shared client device 210 in response to detecting voices from users 208. The audio data can be a digital audio recording of the voices.

In this illustrative example, shared client device 210 can take a number of different forms. Shared client device 210 can be selected from at least one of a smart speaker, a mobile phone, a tablet computer, a laptop computer or other suitable computing devices.

As depicted, requests 206 are sent to virtual assistant 202 running on computer system 204 for processing. In response to processing requests 206, virtual assistant 202 sends responses 214 to requests 206 back to shared client device 210. In this illustrative example, the communications between virtual assistant 202 and shared client device 210 are facilitated through communications links such as wire, optical, or wireless communications links. These communications links can be supported by a network, such as network 102 in FIG. 1. Request 206 and responses 214 can be sent in the form of messages transmitted as electrical signals, optical signals, or radiofrequency signals through communications links.

Virtual assistant 202 can be implemented in software, hardware, firmware or a combination thereof. When software is used, the operations performed by virtual assistant 202 can be implemented in program code configured to run on hardware, such as a processor unit. When firmware is used, the operations performed by virtual assistant 202 can be implemented in program code and data and stored in persistent memory to run on a processor unit. When hardware is employed, the hardware may include circuits that operate to perform the operations in virtual assistant 202.

In the illustrative examples, the hardware may take a form selected from at least one of a circuit system, an integrated circuit, an application specific integrated circuit (ASIC), a programmable logic device, or some other suitable type of hardware configured to perform a number of operations. With a programmable logic device, the device can be configured to perform the number of operations. The device can be reconfigured at a later time or can be permanently configured to perform the number of operations. Programmable logic devices include, for example, a programmable logic array, a programmable array logic, a field programmable logic array, a field programmable gate array, and other suitable hardware devices. Additionally, the processes can be implemented in organic components integrated with inorganic components and can be comprised entirely of organic components excluding a human being. For example, the processes can be implemented as circuits in organic semiconductors.

Computer system 204 is a physical hardware system and includes one or more data processing systems. When more than one data processing system is present in computer system 204, those data processing systems are in communication with each other using a communications medium. The communications medium can be a network. The data processing systems can be selected from at least one of a computer, a server computer, a tablet computer, or some other suitable data processing system.

As depicted, requests 206 includes overlapping requests 216 from users 208. In this illustrative example, overlapping requests 216 are unfulfilled requests received from a single shared client device in which the users making these requests are awaiting responses.

For example, overlapping requests 216 can be requests 206 waiting for processing by virtual assistant 202. As another illustrative example, overlapping requests 216 can include a request in requests 206 received from shared client device 210 in which the request is being processed while other requests in requests 206 received from shared client device 210 are waiting for processing. In yet another illustrative example, overlapping requests 216 can include requests 206 that have been processed to generate responses 214 in which responses 214 have not been sent by virtual assistant 202 back shared client device 210.

As depicted, virtual assistant 202 in computer system 204 receives overlapping requests 216 from users 208 using shared client device 210. In this illustrative example, overlapping requests 216 are requests 206 for which responses 214 have not been sent to shared client device 210. Requests 206 for which responses 214 have not been sent to shared client device 210 can comprise at least one of a request that has not been processed to generate a response or a request that has been processed to generate a response, but the response has not been sent to shared client device 210.

As depicted, virtual assistant 202 determines priorities 218 for overlapping requests 216. In determining priorities 218 for overlapping requests 216, virtual assistant 202 can derive request information 224 from overlapping requests 216. Request information 224 is information used to evaluate the set of priority considerations 222 for determining priorities 218. Request information 224 for a request in overlapping requests 216 can be selected from a group comprising at least one of a request classification, a user identity, a user state, or other suitable information that can be determined from overlapping requests 216 for utilization in determining priorities 218 using priority considerations 222. In other words, requests information 224 is information that can be applied to priority considerations 222.

In this illustrative example, priorities 218 can be comparative priorities 220 in which priority considerations 222 are used to compare overlapping requests 216 to each other to determine values for comparative priorities 220. For example, virtual assistant 202 can determine comparative priorities 220 for overlapping requests 216 based on a set of priority considerations 222 for overlapping requests 216. The set of priority considerations 222 can be selected from a group comprising at least one of a relative importance, a privacy, a continuity, a combinability of responses, a task duration, a presence of a trusted user, a time constraint, or some other suitable consideration for determining priorities for overlapping requests 216.

As used herein, a "set of" when used with reference to items means one or more items. For example, "a set of priority considerations 222" is one or more of priority considerations 222.

In this depicted example, the relative importance can be determined from the classification of each request. In this illustrative example, the classifications can have values. These values can be used to determine priority of a request based on the classification. For example, a table, a database, or other type of data structure can store classifications and values for the classifications. As another example, the classifications and the values can be implemented in an artificial intelligence system 226. When a classification is identified, the value associated with the classification is priority.

The values determined for the different requests can be compared to determine the relative importance of requests to each other in overlapping requests 216. Thus, the classifications of each request can be compared to other classifications of other requests to derive relative importance of the requests to each other.

For example, User A requests "show me what items are on my calendar" and User B requests "Get me directions to the nearest emergency room." In this instance, User B's classification of medical request is assigned a higher relative importance than User A's classification of calendar information.

Another priority consideration is privacy. Each request can be analyzed to determine whether privacy is expected with respect to users 208 making overlapping requests 216. As depicted, privacy can be determined based on a classification of a request. The determination of whether privacy is expected for each request and the identity of the user issuing the request can be analyzed to determine whether a response to a request in overlapping requests 216 would be inappropriate to share with another user who is present at shared client device 210 other than the user making the request.

In the illustrative example, personal or confidential information can be stored by virtual assistant 202 for user when the user opts in for virtual assistant 202 to store in this information. As depicted, the sharing of personal or confidential information is made only with the proper disclosure and consent form that follow privacy rules and regulations, such as the Health Insurance Portability and Accountability Act of 1996. As a result, privacy of information that is personal or confidential is based on permissions that have been authorized by a user in this illustrative example.

For example, User A issues a request "what is the current balance on my checking account?" If User B, who is also issuing a request, is a trusted person, such as a spouse, the digital assistant can reveal this information with User B being present. If User B is not a trusted person, then this information is not shared in their presence. The trusted person is someone who is authorized or designated by User A in these depicted examples.

Another priority consideration is continuity. The classification of each request is analyzed to derive logical order for the requests and whether the order is needed to maintain continuity. For example, User A has issued multiple commands to adjust a meeting on their calendar such as "What time is my next meeting?" and "Please reschedule by 30 minutes." User B issues a request "What is the temperature?" Based on these classifications, User A scores higher with continuity between the two requests and should be processed first.

As depicted, combination is another example of a priority consideration. With combination, the classifications of the requests are analyzed to determine if the requests can be meaningfully combined into a single sentence or response. For example, User A asks "What is the weather right now?" and User B asks "How is the traffic on my ride to work?" The digital assistant can create a combined response such as "The commute has light traffic today and beautiful, sunny 70-degree weather."

In this example, task duration involves analyzing the classifications of each request to determine the completion time to process the different requests in overlapping requests 216. For example, User A requests to play a song and User B requests to update a calendar. The first request can be completed quickly (starting the song) and can be processed first.

Trusted user is a priority consideration that can be considered with privacy. If multiple trusted users are requesting the same action, this action can take priority over other requests due to the higher demand for this service. Time constraint is another priority consideration that can be used in determining priorities for overlapping requests 216. When multiple users are competing for the virtual assistant to respond, virtual assistant 202 can determine the identity of users 208 making overlapping requests 216 and consider schedules or time constraints to determine priorities 218 for overlapping requests 216 and the order overlapping requests 216 should be processed. This feature can be implemented with virtual assistant 202 having access to the calendars of the users.

Virtual assistant 202 processes overlapping requests 216 based on priorities 218 determined for overlapping requests 216. As depicted, the processing of overlapping requests 216 by virtual assistant 202 based on priorities 218 determined for overlapping requests 216 can comprise processing overlapping requests 216 in an order based on priorities 218 determined for overlapping requests 216. Additionally, the processing of overlapping requests 216 by virtual assistant 202 based on priorities 218 determined for overlapping requests 216 can comprise sending responses 214 to overlapping requests 216 to shared client device 210 based on priorities 218 for overlapping requests 216.

For example, a request having a higher priority is processed before a request with a lower priority. Further, in this illustrative example, virtual assistant 202 sends responses 214 to overlapping requests 216 to shared client device 210 based on priorities 218 for overlapping requests 216.

In another illustrative example, a first response to a first request that is already generated from processing the request can be held for delivery to shared client device 210 such that a later response for a second request with a higher priority is sent first. The first response may take longer to present at shared client device 210 than the later response. The priorities determined for the first request and the second request can result in sending the second response before sending the first response even though the first response is generated earlier. In yet another illustrative example, the first response and the second response may be combined into a single combined response based on the priorities and the context.

In the illustrative example, virtual assistant 202 can use artificial intelligence system 226 to perform one or more of the different steps for processing overlapping requests 216. In this depicted example, artificial intelligence system 226 is implemented as part of virtual assistant 202. An artificial intelligence system is a system that has intelligent behavior and can be based on function of the human brain. An artificial intelligence system comprises at least one of an artificial neural network, a cognitive system, a Bayesian network, fuzzy logic, an expert system, a natural language system, a cognitive system, or some other suitable system. Machine learning is used to train the artificial intelligence system. Machine learning involves inputting data to the process and allowing the process to adjust and improve the function of the artificial intelligence system. A cognitive system is a computing system that mimics the function of a human brain.

Figure 3:
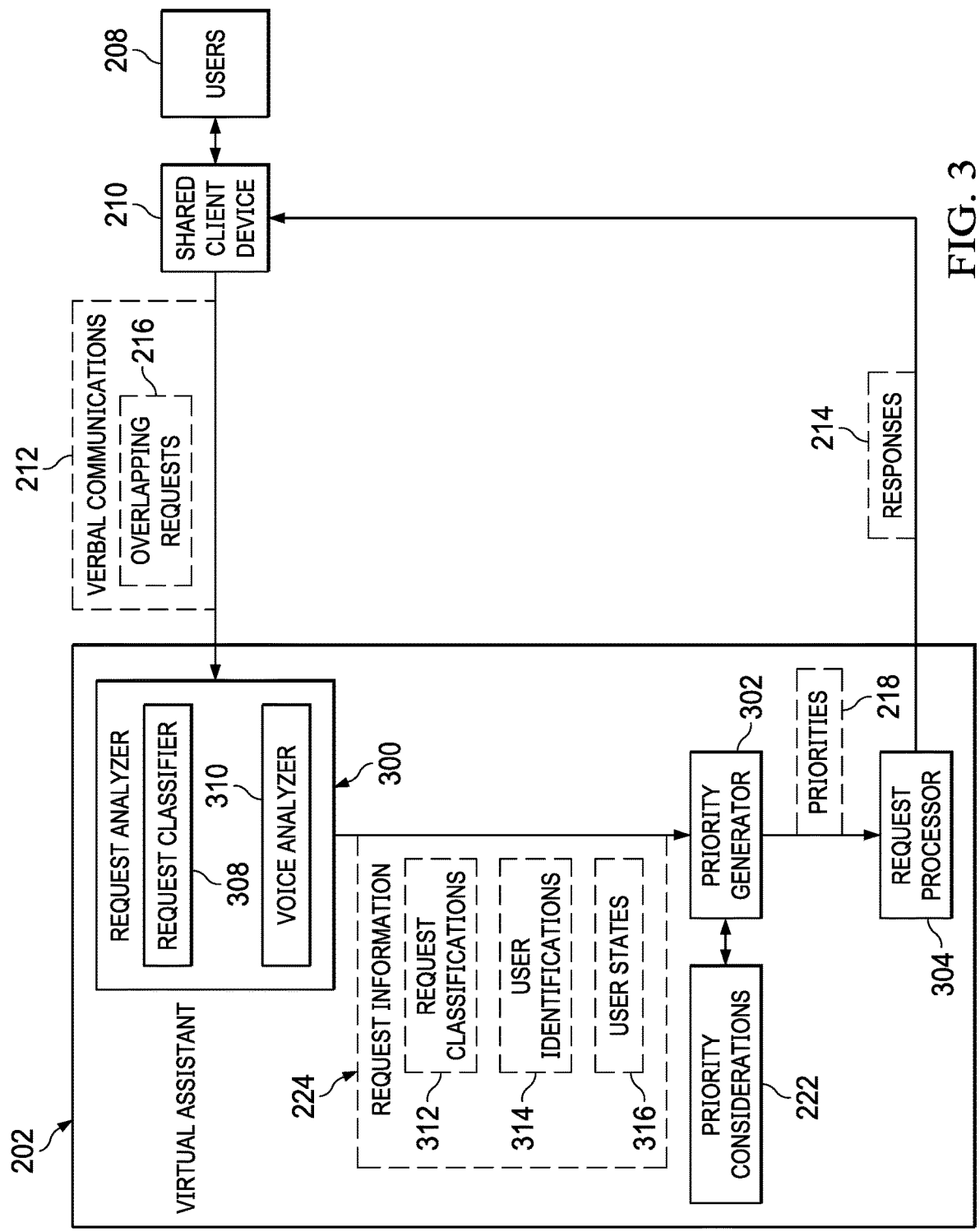
FIG. 3 is a block diagram of components used to process overlapping requests in accordance with an illustrative embodiment.

With reference now to FIG. 3, a block diagram of components used to process overlapping requests is depicted in accordance with an illustrative embodiment. In the illustrative examples, the same reference numeral may be used in more than one figure. This reuse of a reference numeral in different figures represents the same element in the different figures.

In the illustrative example, virtual assistant 202 can include a number of different components that operate to process overlapping requests 216. As depicted, virtual assistant 202 includes request analyzer 300, priority generator 302, and request processor 304.

In this illustrative example, request analyzer 300 receives overlapping requests 216 in verbal communications 212 received from users 208 via shared client device 210. Request analyzer 300 analyzes verbal communications 212 using request classifier 308 and voice analyzer 310 to identify request information 224 for use in determining priorities 218 for overlapping requests 216. As depicted, request information 224 includes request classifications 312, user identifications 314, user states 316, and other suitable information.

In this example, request classifier 308 determines request classifications 312 in request information 224 for overlapping requests 216. Request classifier 308 can utilize natural language processing systems and natural language classifier systems to determine classifications for overlapping requests 216 to generate requests classifications 312.

For example, natural language processing in request classifier 306 can convert voice to text as part of processing verbal communications 212 for overlapping requests 216. The natural language processing can provide a natural language understanding of overlapping requests 216. For example, natural language understanding can be used to extract entities, relationships, keywords, and semantic roles to derive the subject being requested in overlapping requests 216.

Further, voice analyzer 310 in request analyzer 300 can analyze the voices of users 208 in verbal communications 212. Voice analyzer 310 can perform this type of analysis using a voice identification analyzer and a voice tone analyzer.

The voice identification analyzer in voice analyzer 310 can be used to determine user identifications 314 in request information 224. Thus, this analysis can be used to determine the identity of each user issuing a request in overlapping requests 216 through vocal recognition. This vocal recognition can be performed based on the sound and tone of the voices of users 208.

Additionally, the voice tone analyzer in voice analyzer 310 can identify the tone of the voice to determine at least one of an emotional state or an urgency of each user. The results of this analysis forms user states 316 in request information 224 for users 208. In this illustrative example, request information 224 includes user states 316 for users 208 that includes at least one of an emotional state or an urgency for each of users 208.

As depicted, priority generator 302 generates priorities 218 for overlapping requests 216. For example, priority generator 302 determines priority considerations 222 for overlapping requests 216. Priority generator 302 uses request information 224 and priority considerations 222 to determine priorities 218 for overlapping requests 216.

In this illustrative example, request processor 304 processes overlapping requests 216 based on priorities 218. As depicted, the processing can include the order in which overlapping requests 216 are processed to form responses 214. The process can also include the order, the timing, or both the order and the timing in sending responses 214 back to shared client device 210. Alternatively, the processing can be both the processing of overlapping requests 216 to generate responses 214 and the sending of responses 214 to shared client device 210 based on priorities 218.

In one illustrative example, one or more technical solutions are present that overcome a problem with processing requests in the order received. As a result, one or more technical solutions may provide a technical effect for processing overlapping requests in a manner that more closely resembles a conversation between the virtual assistant and the users. One or more technical solutions can provide a priority in processing requests that have a higher urgency and processing requests that provide a more natural flow for a conversations with questions and answers involving a virtual assistant and users at a shared client device.

Computer system 204 can be configured to perform at least one of the steps, operations, or actions described in the different illustrative examples using software, hardware, firmware or a combination thereof. As a result, computer system 204 operates as a special purpose computer system in which virtual assistant 202 in computer system 204 enables determining priorities for overlapping requests received from users using a shared client device and processing the overlapping requests based on these priorities. In particular, virtual assistant 202 transforms computer system 204 into a special purpose computer system as compared to currently available general computer systems that do not have virtual assistant 202.

In the illustrative example, the use of virtual assistant 202 in computer system 204 integrates processes into a practical application for processing overlapping requests from users using a shared client device and increases the performance of computer system 204. In other words, virtual assistant 202 with components such as request analyzer 300, priority generator 302, and request processor 304 in computer system 204 is directed to a practical application of processes integrated into virtual assistant 202 in computer system 204 that determines priorities for overlapping requests received from a shared client device and processes overlapping requests based on the priorities. In this manner, virtual assistant 202 in computer system 204 provides a practical application for processing overlapping requests from users using a shared client device. These processes increase the ability of computer system 204 to provide at least one of providing responses to users in a manner that takes into account priorities for the requests or increase the interaction between the users and computer system 204 in a manner that more closely resembles that of a natural conversation. In this manner, computer system 204 can operate in a manner that more closely resembles a human user in interactions with users sharing a smart device.

The illustration of request processing environment 200 and the different components in FIG. 2 and FIG. 3 is not meant to imply physical or architectural limitations to the manner in which an illustrative embodiment can be implemented. Other components in addition to or in place of the ones illustrated may be used. Some components may be unnecessary. Also, the blocks are presented to illustrate some functional components. One or more of these blocks may be combined, divided, or combined and divided into different blocks when implemented in an illustrative embodiment.

For example, one or more shared client devices in addition to shared client device 210 can be present in request processing environment 200 in which virtual assistant 202 can determine priorities for other overlapping requests from additional users at those shared clients. As another example, one or more functions in virtual assistant 202 in computer system 204 can be distributed to shared client device 210. For example, voice analyzer 310 for request classifier 308 can be performed by shared client device 210 in some illustrative examples.

Further, although the illustrative example is described with respect to requests 206 being made in verbal communications 212, other illustrative examples can take into other types of communication. For example, some of users 208 may use a keyboard and enter text with the keyboard to generate requests 206 rather than using verbal communications 212.

Figure 4:
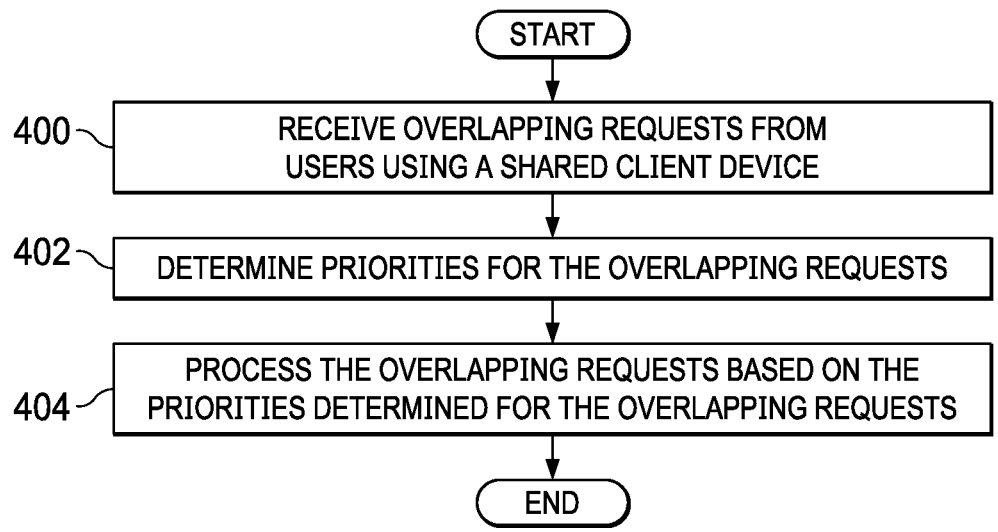
FIG. 4 is a flowchart of a process for processing requests in accordance with an illustrative embodiment.

Turning next to FIG. 4, a flowchart of a process for processing requests is depicted in accordance with an illustrative embodiment. The process in FIG. 4 can be implemented in hardware, software, or both. When implemented in software, the process can take the form of program code that is run by one of more processor units located in one or more hardware devices in one or more computer systems. For example, the process can be implemented in virtual assistant 202 in computer system 204 in FIG. 2.

The process begins receiving overlapping requests from users using a shared client device (step 400). The overlapping requests are requests for which responses have not been sent to the shared client device. For example, overlapping requests can occur when a back and forth conversation between a first user and a virtual assistant at a shared client device is interrupted by a second user at the shared client device. Overlapping requests can also include simultaneously issued requests by two or more users at a shared client device. In this situation, multiple channels can be trained to hear and process vocal requests issued from two users at the same time.

The process determines priorities for the overlapping requests (step 402). In step 402, the process determines the priorities for the overlapping requests based on a set of priority considerations for the overlapping requests and using request information derived from the overlapping requests in which the request information includes at least one of an emotional state or an urgency for each of the requests. The process processes the overlapping requests based on the priorities determined for the overlapping requests (step 404). The process terminates thereafter.

Figure 5:
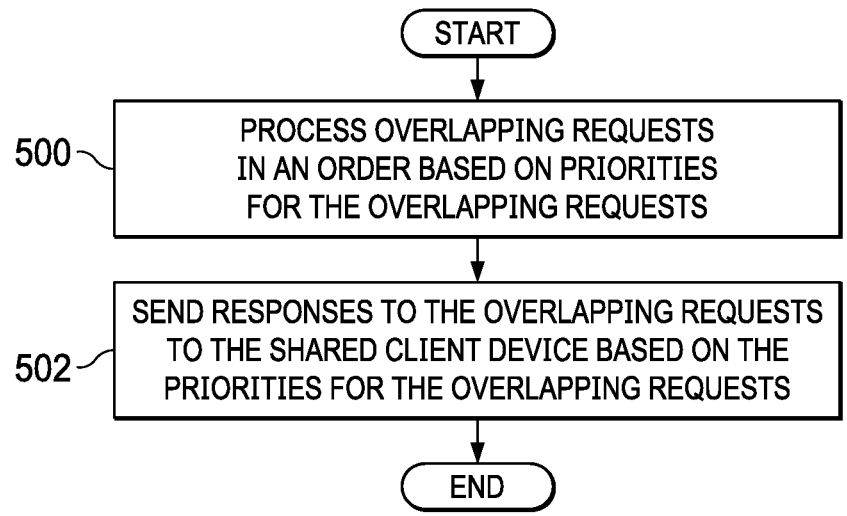
FIG. 5 is a flowchart of a process for processing overlapping requests based on priorities in accordance with an illustrative embodiment.

With reference now to FIG. 5, a flowchart of a process for processing overlapping requests based on priorities is depicted in accordance with an illustrative embodiment. The process illustrated in FIG. 5 is an example of one manner in which step 404 in FIG. 4 can be implemented.

The process begins by processing overlapping requests in an order based on priorities for the overlapping requests (step 500). The process sends responses to the overlapping requests to the shared client device based on the priorities for the overlapping requests (step 502). The process terminates thereafter.

The responses can also be sent based on the priorities for the overlapping requests. In other words, the responses can be sent in order based on the priorities determined for overlapping requests. In some illustrative examples, although one request may be selected for processing prior to another requests, if parallel processing is utilized, a request that has a higher priority may have a response that is generated later than another request that has a lower priority.

Figure 6:
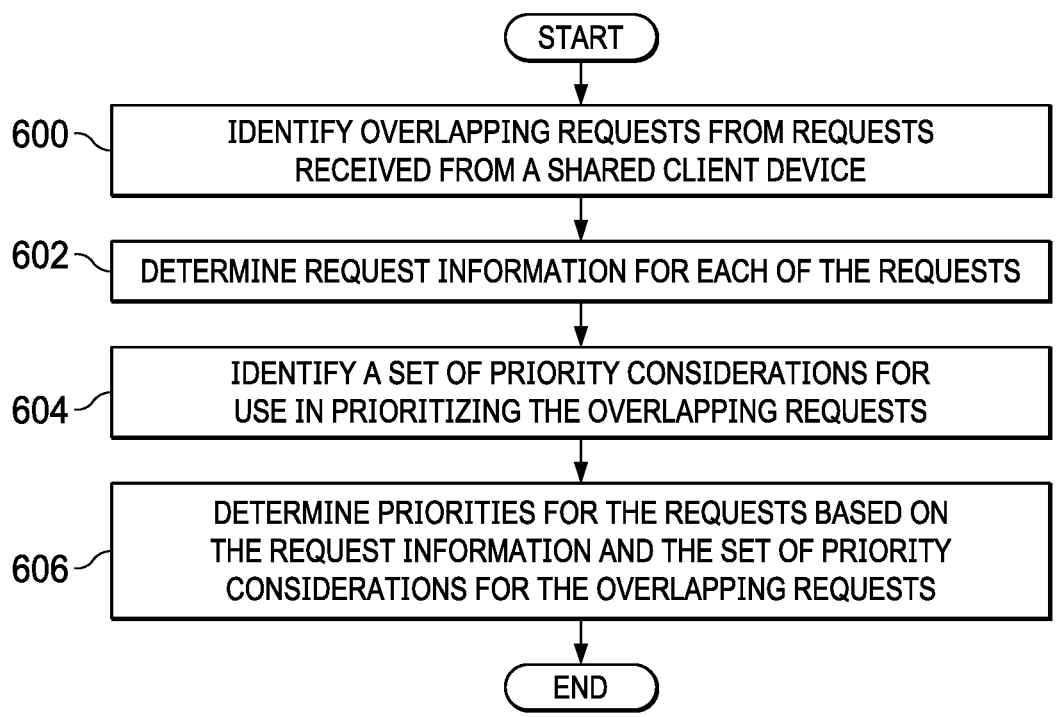
FIG. 6 is a flowchart of a process for determining priorities for overlapping requests in accordance with an illustrative embodiment.

With reference now to FIG. 6, a flowchart of a process for determining priorities for overlapping requests is depicted in accordance with an illustrative embodiment. The process illustrated in FIG. 6 is an example of one manner in which step 402 in FIG. 4 can be performed.

The process begins by identifying overlapping requests from requests received from a shared client device (step 600). Step 600 can include determining which requests have responses that have not been sent to the shared client device. Step 600 can also include determining which requests have not yet been processed to generate responses. These types of requests may be considered overlapping requests in the illustrative examples.

The process determines request information for each of the requests (step 602). In this illustrative example, the request information for each of the requests includes at least one of a request classification, a user identifier, a user state, or some other suitable information that can be derived from a request for use with priority considerations to determine a priority of the request. This priority can be compared to other priorities for other requests.

The process identifies a set of priority considerations for use in prioritizing the overlapping requests (step 604). In step 604, the set of priority considerations can be selected from at least one of a relative importance, a privacy, a continuity, a combinability of responses, a task duration, a presence of a trusted user, a time constraint, or other suitable considerations.

The process determines priorities for the requests based on the request information and the set of priority considerations for the overlapping requests (step 606). The process terminates thereafter.

Figure 7:
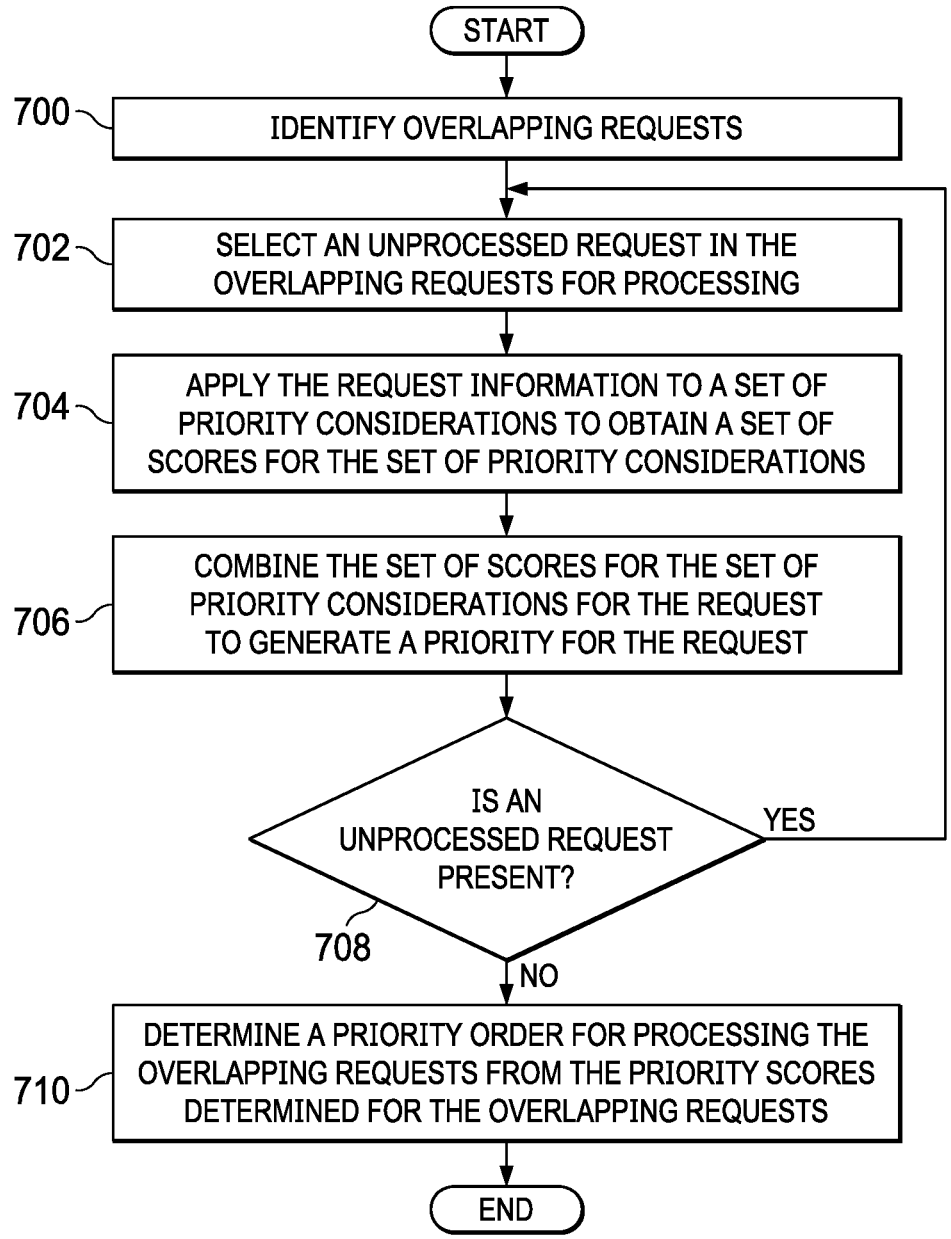
FIG. 7 is a flowchart of a process for determining priorities for overlapping requests using request information and a set of priority considerations in accordance with an illustrative embodiment.

In FIG. 7, a flowchart of a process for determining priorities for overlapping requests using request information and a set of priority considerations is depicted in accordance with an illustrative embodiment. The process illustrated in FIG. 7 is an example of one manner in which step 606 in FIG. 6 can be implemented.

The process begins by identifying overlapping requests (step 700). The process selects an unprocessed request in the overlapping requests for processing (step 702). The process applies the request information to a set of priority considerations to obtain a set of scores for the set of priority considerations (step 704). In step 704, a priority score is generated for each priority consideration in the set of priority considerations. For example, if the priority considerations include relative importance, privacy, and combinability of responses, a priority score is generated for each of these priority considerations.

The process combines the set of scores for the set of priority considerations for the request to generate a priority for the request (step 706). A determination is made as to whether an unprocessed request is present (step 708). If an unprocessed request is present, the process returns to step 702 to select another request for processing. Otherwise, the process determines a priority order for processing the overlapping requests from the priority scores determined for the overlapping requests (step 710). The process terminates thereafter.

Figure 8:
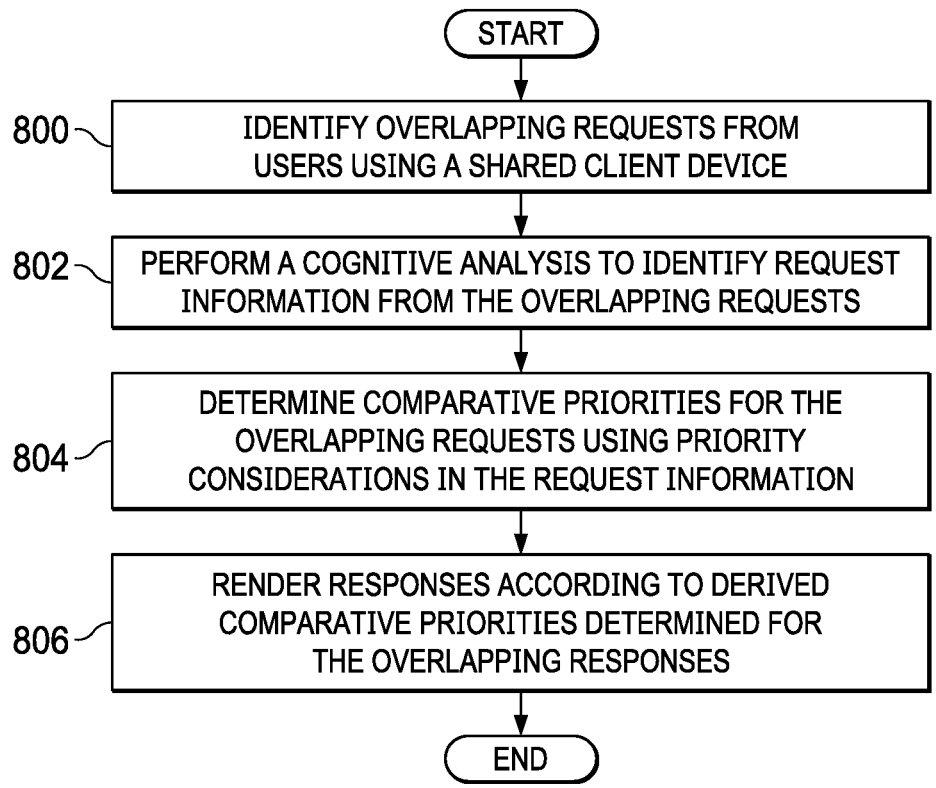
FIG. 8 is a flowchart of a process for processing requests in accordance with an illustrative embodiment.

Turning next to FIG. 8, a flowchart of a process for processing requests is depicted in accordance with an illustrative embodiment. The process in FIG. 8 can be implemented in hardware, software, or both. When implemented in software, the process can take the form of program code that is run by one of more processor units located in one or more hardware devices in one or more computer systems. For example, the process can be implemented in virtual assistant 202 in computer system 204 in FIG. 2.

The process begins by identifying overlapping requests from users using a shared client device (step 800). The process performs a cognitive analysis to identify request information from the overlapping requests (step 802). In step 802, the cognitive analysis can be using an artificial intelligence system in which the artificial intelligence system identifies request information, such as request classifications, user identifications, or user states from the overlapping requests. In this illustrative example, the analysis can be performed using verbal communications. Voice analysis is used to identify users and states of the users from the verbal communications. In this example, the status of the users are emotional states of the users. The emotional states can be used to determine urgency of a request.

The process determines comparative priorities for the overlapping requests using priority considerations in the request information (step 804). In step 804, comparative priorities are priorities determined using a set of priority consideration, such as, at least one of a relative importance, a privacy, a continuity, a combinability of responses, a task duration, a presence of a trusted user, a time constraint, or some other suitable consideration.

The process then renders responses according to derived comparative priorities determined for the overlapping responses (step 806). The process terminates thereafter. In step 806, the process renders responses to overlapping requests in the order of the comparative priorities determined for the overlapping requests by at least one of generating responses for the overlapping requests based on the comparative priorities or sending responses for the overlapping requests based on the comparative priorities.

The flowcharts and block diagrams in the different depicted embodiments illustrate the architecture, functionality, and operation of some possible implementations of apparatuses and methods in an illustrative embodiment. In this regard, each block in the flowcharts or block diagrams may represent at least one of a module, a segment, a function, or a portion of an operation or step. For example, one or more of the blocks can be implemented as program code, hardware, or a combination of the program code and hardware. When implemented in hardware, the hardware may, for example, take the form of integrated circuits that are manufactured or configured to perform one or more operations in the flowcharts or block diagrams. When implemented as a combination of program code and hardware, the implementation may take the form of firmware. Each block in the flowcharts or the block diagrams can be implemented using special purpose hardware systems that perform the different operations or combinations of special purpose hardware and program code run by the special purpose hardware.

In some alternative implementations of an illustrative embodiment, the function or functions noted in the blocks may occur out of the order noted in the figures. For example, in some cases, two blocks shown in succession can be performed substantially concurrently, or the blocks may sometimes be performed in the reverse order, depending upon the functionality involved. Also, other blocks can be added in addition to the illustrated blocks in a flowchart or block diagram. For example, in FIG. 5, the processing of the overlapping requests can be performed using either step 500 or step 502 rather than using both steps.

Figure 9:
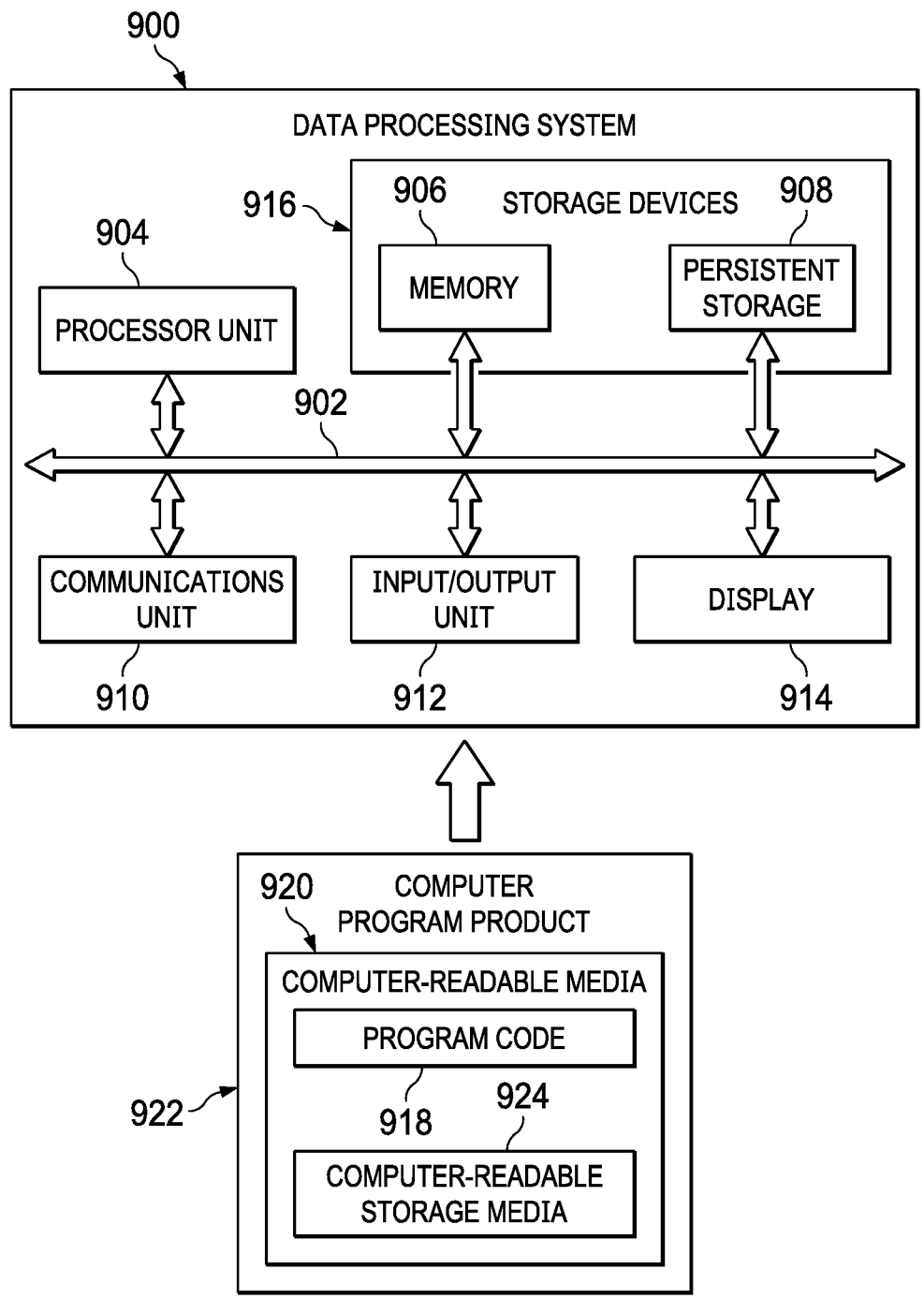
FIG. 9 is a block diagram of a data processing system in accordance with an illustrative embodiment.

Turning now to FIG. 9, a block diagram of a data processing system is depicted in accordance with an illustrative embodiment. Data processing system 900 can be used to implement server computer 104, server computer 106, and client devices 110 in FIG. 1. Data processing system 900 can also be used to implement computer system 204 and shared client device 210 in FIG. 2. In this illustrative example, data processing system 900 includes communications framework 902, which provides communications between processor unit 904, memory 906, persistent storage 908, communications unit 910, input/output (I/O) unit 912, and display 914. In this example, communications framework 902 takes the form of a bus system.

Processor unit 904 serves to execute instructions for software that can be loaded into memory 906. Processor unit 904 includes one or more processors. For example, processor unit 904 can be selected from at least one of a multicore processor, a central processing unit (CPU), a graphics processing unit (GPU), a physics processing unit (PPU), a digital signal processor (DSP), a network processor, or some other suitable type of processor. For example, further, processor unit 904 can may be implemented using one or more heterogeneous processor systems in which a main processor is present with secondary processors on a single chip. As another illustrative example, processor unit 904 can be a symmetric multi-processor system containing multiple processors of the same type on a single chip.

Memory 906 and persistent storage 908 are examples of storage devices 916. A storage device is any piece of hardware that is capable of storing information, such as, for example, without limitation, at least one of data, program code in functional form, or other suitable information either on a temporary basis, a permanent basis, or both on a temporary basis and a permanent basis. Storage devices 916 may also be referred to as computer-readable storage devices in these illustrative examples. Memory 906, in these examples, can be, for example, a random-access memory or any other suitable volatile or non-volatile storage device. Persistent storage 908 may take various forms, depending on the particular implementation.

For example, persistent storage 908 may contain one or more components or devices. For example, persistent storage 908 can be a hard drive, a solid-state drive (SSD), a flash memory, a rewritable optical disk, a rewritable magnetic tape, or some combination of the above. The media used by persistent storage 908 also can be removable. For example, a removable hard drive can be used for persistent storage 908.

Communications unit 910, in these illustrative examples, provides for communications with other data processing systems or devices. In these illustrative examples, communications unit 910 is a network interface card.

Input/output unit 912 allows for input and output of data with other devices that can be connected to data processing system 900. For example, input/output unit 912 may provide a connection for user input through at least one of a keyboard, a mouse, or some other suitable input device. Further, input/output unit 912 may send output to a printer. Display 914 provides a mechanism to display information to a user. In this illustrative example, display 914 is optional component. Some implementations of data processing system 900 may omit display 914.

Instructions for at least one of the operating system, applications, or programs can be located in storage devices 916, which are in communication with processor unit 904 through communications framework 902. The processes of the different embodiments can be performed by processor unit 904 using computer-implemented instructions, which may be located in a memory, such as memory 906.

These instructions are referred to as program code, computer usable program code, or computer-readable program code that can be read and executed by a processor in processor unit 904. The program code in the different embodiments can be embodied on different physical or computer-readable storage media, such as memory 906 or persistent storage 908.

Program code 918 is located in a functional form on computer-readable media 920 that is selectively removable and can be loaded onto or transferred to data processing system 900 for execution by processor unit 904. Program code 918 and computer-readable media 920 form computer program product 922 in these illustrative examples. In the illustrative example, computer-readable media 920 is computer-readable storage media 924.

In these illustrative examples, computer-readable storage media 924 is a physical or tangible storage device used to store program code 918 rather than a medium that propagates or transmits program code 918.

Alternatively, program code 918 can be transferred to data processing system 900 using a computer-readable signal media. The computer-readable signal media can be, for example, a propagated data signal containing program code 918. For example, the computer-readable signal media can be at least one of an electromagnetic signal, an optical signal, or any other suitable type of signal. These signals can be transmitted over connections, such as wireless connections, optical fiber cable, coaxial cable, a wire, or any other suitable type of connection.

The different components illustrated for data processing system 900 are not meant to provide architectural limitations to the manner in which different embodiments can be implemented. In some illustrative examples, one or more of the components may be incorporated in or otherwise form a portion of, another component. For example, memory 906, or portions thereof, may be incorporated in processor unit 904 in some illustrative examples. The different illustrative embodiments can be implemented in a data processing system including components in addition to or in place of those illustrated for data processing system 900. Other components shown in FIG. 9 can be varied from the illustrative examples shown. The different embodiments can be implemented using any hardware device or system capable of running program code 918.

Thus, the illustrative embodiments of the present invention provide a computer implemented method, an apparatus, a computer system, and computer program product for processing requests. Overlapping requests are received by a computer system from users using a shared client device, wherein the overlapping requests are requests for which responses have not been sent to the shared client device. Priorities for the overlapping requests are determined by the computer system. The overlapping requests are processed by the computer system based on the priorities determined for the overlapping requests.

In one illustrative example, comparative priority scores are calculated for requests taking into account a set of priority considerations when the requests are overlapping requests are made to a virtual assistant from multiple users at a shared client device. The priority considerations are considered based upon analysis of priority considerations such as relative importance, privacy, continuity, combination, and task duration. The virtual assistant responds to overlapping requests through comparing the comparative priority scores calculated for the overlapping requests to determine the order in which responses are given.

In contrast to current virtual assistants that process overlapping requests in a queue on a first in first out (FIFO) basis, a virtual assistant in a computer system illustrative examples can process overlapping requests in a manner that more closely resembles a conversation between the virtual assistant and the users. For example, in one or more illustrative examples, a priority can be used processing requests that provide a more natural flow for questions and answers to users at a shared client device.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiment. The terminology used herein was chosen to best explain the principles of the embodiment, the practical application or technical improvement over technologies found in the marketplace, or to enable others of ordinary skill in the art to understand the embodiments disclosed here.

What is claimed is:

1. A method for processing requests, the method comprising:

receiving, by a computer system via a network, overlapping requests from a plurality of different users using a shared client device, wherein the overlapping requests are the requests for which responses have not been sent to the shared client device;

determining, from request information derived from the overlapping requests, user identifications of the plurality of different users and identifying a tone of voice for each of the overlapping requests to determine at least one of an emotional state or an urgency;

determining, by the computer system, priorities for the overlapping requests based on a set of priority considerations for the overlapping requests and using the request information derived from the overlapping requests; and processing, by the computer system, the overlapping requests in an order based on the priorities determined for the overlapping requests, wherein processing, by the computer system, the overlapping requests based on the priorities determined for the overlapping requests comprises:

selecting an unprocessed request from the overlapping requests;

applying the request information to the set of priority considerations to obtain a set of scores for the set of priority considerations; and combining the set of scores for the set of priority considerations for the unprocessed request to generate a priority for the unprocessed request;

wherein processing, by the computer system, the overlapping requests for which responses have not been sent to the shared client device based on the priorities determined for the overlapping requests comprises sending, by the computer system, responses to the overlapping requests to the shared client device based on the priorities for the overlapping requests; and wherein the set of priority considerations includes a combinability of responses, and wherein processing, by the computer system, the overlapping requests based on the priorities determined for the overlapping requests comprises combining, based on the set of priority considerations, at least two of the responses to the overlapping requests into a single combined response including the at least two of the responses to the overlapping requests that is sent by the computer system to the shared client device.

2. The method of claim 1, wherein the set of priority considerations is a presence of a trusted user, wherein the overlapping requests are at least a first request from a first user and a second request from a second user, and wherein processing, by the computer system, the overlapping requests based on the priorities determined for the overlapping requests comprises:

responding to the first request responsive to determining that the second user is a trusted user of the first user as designated by the first user, and not responding to the first request responsive to determining that the second user is not the trusted user of the first user.

3. The method of claim 1, wherein the requests for which responses have not been sent to the shared client device comprises a request that has been processed but a response thereto has not been sent to the shared client device such that a second response having a higher priority is sent to the shared client device before the response is sent to the shared client device even though the first response was generated earlier than the second response was generated.

4. The method of claim 1, wherein receiving, by a computer system, the overlapping requests from the users using the shared client device in which the overlapping requests are the requests for which responses have not been sent to the shared client device; determining, by the computer system, the priorities for the overlapping requests; and processing, by the computer system, the overlapping requests based on the priorities determined for the overlapping requests are performed by a virtual assistant.

5. The method of claim 4, wherein the virtual assistant uses an artificial intelligence system, and further comprising:

sending, by the computer system, the responses to the overlapping requests to the shared client device based on the priorities determined for the overlapping requests such that both the processing of overlapping requests and the sending of the responses are both performed based on the priorities determined for the overlapping requests.

6. A request processing system comprising:

a computer system that receives via a network overlapping requests from a plurality of different users using a shared client device, wherein the overlapping requests are requests for which responses have not been sent to the shared client device; determines, from request information derived from the overlapping requests, user identifications of the plurality of different users and identifying a tone of voice for each of the overlapping requests to determine at least one of an emotional state or an urgency; determines priorities for the overlapping requests based on a set of priority considerations and the request information for the overlapping requests; and processes the overlapping requests in an order based on the priorities determined for the overlapping requests, wherein processing, by the computer system, the overlapping requests based on the priorities determined for the overlapping requests comprises:

selecting an unprocessed request from the overlapping requests;

applying the request information to the set of priority considerations to obtain a set of scores for the set of priority considerations;

combining the set of scores for the set of priority considerations for the unprocessed request to generate a priority for the unprocessed request; and sending the responses to the overlapping requests to the shared client device based on the priorities for the overlapping requests; and wherein the set of priority considerations includes a combinability of responses, and wherein processing, by the computer system, the overlapping requests based on the priorities determined for the overlapping requests comprises combining, based on the set of priority considerations, at least two of the responses to the overlapping requests into a single combined response including the at least two of the responses to the overlapping requests that is sent by the computer system to the shared client device.

7. The request processing system of claim 6, wherein the set of priority considerations is a presence of a trusted user, wherein the overlapping requests are at least a first request from a first user and a second request from a second user, and wherein processing, by the computer system, the overlapping requests based on the priorities determined for the overlapping requests comprises:

responding to the first request responsive to determining that the second user is a trusted user of the first user as designated by the first user, and not responding to the first request responsive to determining that the second user is not the trusted user of the first user.

8. The request processing system of claim 6, wherein the requests for which the responses have not been sent to the shared client device comprises a request that has been processed but a response thereto has not been sent to the shared client device such that a second response having a higher priority is sent to the shared client device before the response is sent to the shared client device even though the first response was generated earlier than the second response was generated.

9. A computer program product for processing requests, the computer program product comprising:

a computer-readable storage media;

first program code, stored on the computer-readable storage media, for receiving via a network overlapping requests from a plurality of different users using a shared client device, wherein the overlapping requests are the requests for which responses have not been sent to the shared client device;

second program code, stored on the computer-readable storage media, for determining, from request information derived from the overlapping requests, user identifications of the plurality of different users and identifying a tone of voice for each of the overlapping requests to determine at least one of an emotional state or an urgency;

third program code, stored on the computer-readable storage media, for determining, by a computer system, priorities for the overlapping requests based on a set of priority considerations for the overlapping requests and using the request information derived from the overlapping requests; and fourth program code, stored on the computer-readable storage media, for processing the overlapping requests in an order based on the priorities determined for the overlapping requests, wherein processing, by the computer system, the overlapping requests based on the priorities determined for the overlapping requests comprises:

selecting an unprocessed request from the overlapping requests;

applying the request information to the set of priority considerations to obtain a set of scores for the set of priority considerations; and combining the set of scores for the set of priority considerations for the unprocessed request to generate a priority for the unprocessed request;

wherein the third program code comprises program code, stored on the computer-readable storage media, for sending the responses to the overlapping requests to the shared client device based on the priorities for the overlapping requests; and wherein the set of priority considerations includes a combinability of responses, and wherein processing, by the computer system, the overlapping requests based on the priorities determined for the overlapping requests comprises combining, based on the set of priority considerations, at least two of the responses to the overlapping requests into a single combined response including the at least two of the responses to the overlapping requests that is sent by the computer system to the shared client device.

10. The computer program product of claim 9, wherein the set of priority considerations is a presence of a trusted user, wherein the overlapping requests are at least a first request from a first user and a second request from a second user, and wherein processing, by the computer system, the overlapping requests based on the priorities determined for the overlapping requests comprises:

responding to the first request responsive to determining that the second user is a trusted user of the first user as designated by the first user, and not responding to the first request responsive to determining that the second user is not the trusted user of the first user.

11. The computer program product of claim 9, wherein the requests for which responses have not been sent to the shared client device comprises a request that has been processed but a response thereto has not been sent to the shared client device such that a second response having a higher priority is sent to the shared client device before the response is sent to the shared client device even though the first response was generated earlier than the second response was generated.

* * * * *